United States Patent
Parrett et al.

(10) Patent No.: US 9,435,383 B2
(45) Date of Patent: Sep. 6, 2016

(54) UNIVERSAL JOINT WITH COOLING SYSTEM

(71) Applicant: Moyno, Inc., Springfield, OH (US)

(72) Inventors: Dale H. Parrett, Springboro, OH (US); Adam C. Downey, Springfield, OH (US); David R. Pitsch, Springfield, OH (US); Michael D. Amburgey, London, OH (US)

(73) Assignee: MOYNO, INC., Springfield, OH (US)

( * ) Notice: Subject to any disclaimer, the term of this patent is extended or adjusted under 35 U.S.C. 154(b) by 0 days.

(21) Appl. No.: 14/122,481

(22) PCT Filed: Sep. 25, 2012

(86) PCT No.: PCT/US2012/057062
§ 371 (c)(1),
(2) Date: Nov. 26, 2013

(87) PCT Pub. No.: WO2013/049030
PCT Pub. Date: Apr. 4, 2013

(65) Prior Publication Data
US 2014/0227121 A1    Aug. 14, 2014

Related U.S. Application Data

(60) Provisional application No. 61/541,771, filed on Sep. 30, 2011.

(51) Int. Cl.
*F01C 1/10* (2006.01)
*F03C 2/00* (2006.01)
(Continued)

(52) U.S. Cl.
CPC ............... *F16D 3/80* (2013.01); *F04C 2/1071* (2013.01); *F04C 2/1073* (2013.01);
(Continued)

(58) Field of Classification Search
CPC  F04C 2/1071; F04C 2/1073; F04C 15/0061; F04C 15/0073; F04C 15/0096; F04C 2240/10; F04C 2240/50; F04C 2240/601; F04C 2240/802; F16D 3/80
USPC ......... 418/1, 48, 101, 182, 152–153; 464/24
See application file for complete search history.

(56) References Cited

U.S. PATENT DOCUMENTS 2,512,764 A   6/1950  Byram
2,612,845 A   10/1952 Byram et al.
(Continued)

FOREIGN PATENT DOCUMENTS

DE   102010007906   8/2011
EP       0845598   11/1997
(Continued)

OTHER PUBLICATIONS

PCT, International Search Report and Written Opinion, PCT/US2012/057062 (Dec. 17, 2012).
(Continued)

*Primary Examiner* — Theresa Trieu
(74) *Attorney, Agent, or Firm* — Thompson Hine LLP

(57) ABSTRACT

A progressing cavity pump system including a rotor and a stator having an inner cavity. The rotor is rotationally disposed inside the inner cavity of the stator such that rotation of the rotor relative to the stator causes material in the inner cavity to be pumped therethrough. The pump system further includes a universal joint directly or indirectly rotationally coupled to the rotor, and a cooling system thermally coupled to the universal joint and configured to cool the universal joint by active heat exchange at a position remote from the universal joint.

29 Claims, 9 Drawing Sheets

(51) Int. Cl.
*F03C 4/00* (2006.01)
*F04C 2/00* (2006.01)
*F16D 3/80* (2006.01)
*F04C 29/04* (2006.01)
*F04C 2/107* (2006.01)
*F04C 15/00* (2006.01)

(52) U.S. Cl.
CPC ...... *F04C 15/0073* (2013.01); *F04C 15/0096* (2013.01); *F04C 29/04* (2013.01); *F04C 2240/10* (2013.01); *F04C 2240/50* (2013.01)

(56) References Cited

U.S. PATENT DOCUMENTS

| | | |
|---|---|---|
| 3,340,814 A | 9/1967 | Streicher |
| 3,693,710 A | 9/1972 | Drosnin |
| 4,029,368 A | 6/1977 | Tschirky et al. |
| 4,038,000 A | 7/1977 | Dworak |
| 4,639,200 A | 1/1987 | Baumgardner et al. |
| 4,983,106 A | 1/1991 | Wright et al. |
| 5,096,410 A | 3/1992 | Loulourgas |
| 5,197,869 A | 3/1993 | Hansen et al. |
| 5,624,243 A | 4/1997 | Omodaka et al. |
| 5,688,114 A | 11/1997 | Millington et al. |
| 5,722,820 A | 3/1998 | Wild et al. |
| 5,820,354 A | 10/1998 | Wild et al. |
| 5,857,842 A | 1/1999 | Sheehan |
| 6,120,267 A | 9/2000 | Cunningham |
| 6,315,537 B1 | 11/2001 | Helbing et al. |
| 6,457,950 B1 | 10/2002 | Cooper et al. |
| 6,491,591 B1 | 12/2002 | Schuster |
| 7,312,995 B2 | 12/2007 | Wilson et al. |
| 2001/0031214 A1 | 10/2001 | Haavik |
| 2012/0107143 A1 | 5/2012 | Gilarranz |

FOREIGN PATENT DOCUMENTS

| | | |
|---|---|---|
| WO | 98/20259 | 5/1998 |
| WO | 02/18792 | 3/2002 |
| WO | 2009/023764 | 2/2009 |
| WO | 2009/023765 | 2/2009 |

OTHER PUBLICATIONS

EP, Extended European Search Report and Opinion; Patent Application No. 12835967.6 (Jul. 16, 2015).

UNIVERSAL JOINT WITH COOLING SYSTEM

CROSS-REFERENCE TO RELATED APPLICATIONS

This application is a National Stage filing of International Application No. PCT/US2012/057062, filed Sep. 25, 2012, which claims the benefit of U.S. Provisional Application No. 61/541,771, filed Sep. 30, 2011. The entire contents of both of these applications are incorporated by reference herein.

The present invention is directed to a universal joint, and more particularly, to a universal joint with a cooling system to reduce overheating.

BACKGROUND

Universal joints, such as gear joints, are often used to rotationally couple components, particularly rotating components in which one or both of the components rotates in an eccentric manner. One particular use for gear joints is to rotationally couple a drive shaft to a rotor in a progressing cavity pump. However, many existing gear joints used in progressing cavity pumps can generate excessive heat during operation which can limit the capacity of the pump, cause degradation in performance, and ultimately lead to failure of the gear joint.

SUMMARY

In one embodiment, the present invention is a progressing cavity pump system including a rotor and a stator having an inner cavity. The rotor is rotationally disposed inside the inner cavity of the stator such that rotation of the rotor relative to the stator causes material in the inner cavity to be pumped therethrough. The pump system further includes a universal joint directly or indirectly rotationally coupled to the rotor, and a cooling system thermally coupled to the universal joint and configured to cool the universal joint by active heat exchange at a position remote from the universal joint.

DETAILED DESCRIPTION

Figure 1:
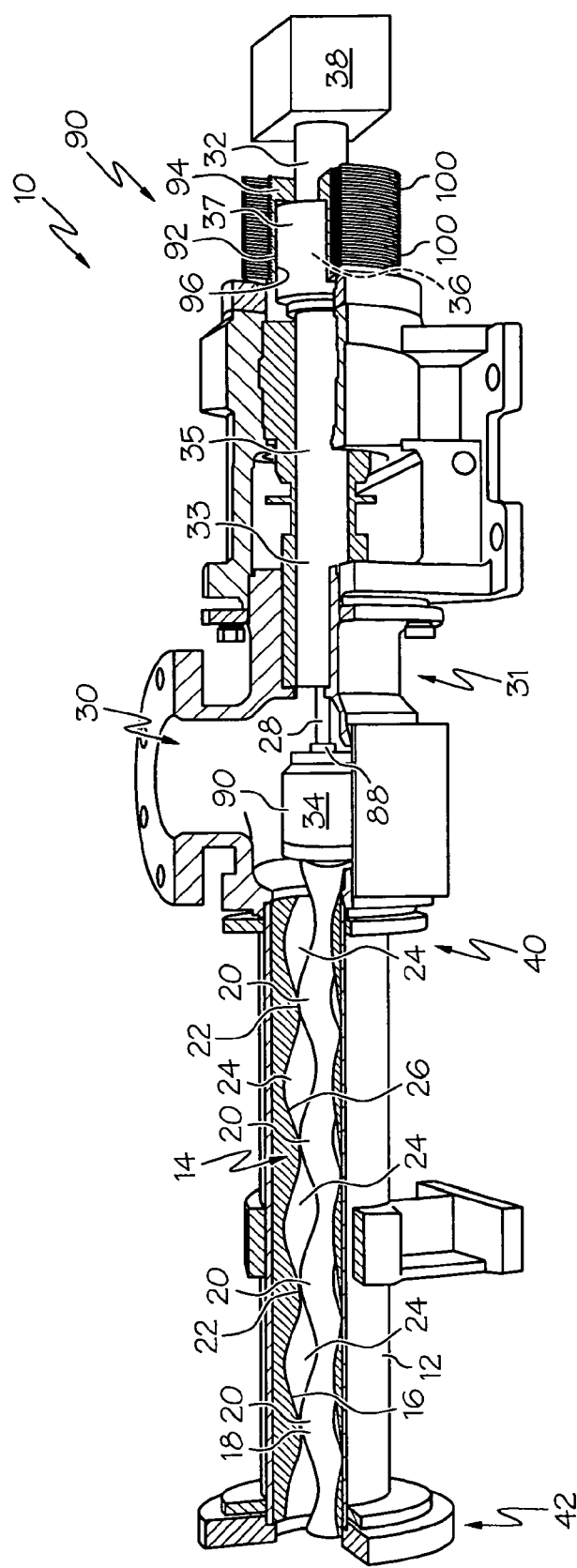
FIG. 1 is a side perspective partial cut-away view of a progressing cavity pump with a cooling system.

A universal joint, or gear joint, cooling system, such as that disclosed herein, may be used as part of or in conjunction with a progressing cavity pump, such as the progressing cavity pump 10 shown in FIG. 1. The pump 10 may include a generally cylindrical stator tube 12 having a stator 14 located therein. The stator 14 has an opening or internal bore 16 extending generally axially or longitudinally therethrough in the form of a double lead helical nut to provide an internally threaded stator 14. The pump 10 includes an externally threaded rotor 18 in the form of a single lead helical screw rotationally received inside stator 14. The rotor 18 may include a single external helical lobe 20, with the pitch of the lobe 20 being twice the pitch of the internal helical grooves of the stator 14.

The rotor 18 fits within the stator bore 16 to provide a series of helical seal lines 22 where the rotor 18 and stator 14 contact each other or come in close proximity to each other. In particular, the external helical lobe 20 of the rotor 18 and the internal helical grooves of the stator 14 define the plurality of cavities 24 therebetween. The stator 14 has an inner surface 26 which the rotor 18 contacts or nearly contacts to create the cavities 24/seal lines 22.

The pump 10 has an radially extending opening 30 into which material to be pumped may be fed, or pumped material is expelled, depending upon the direction of operation of the pump 10. The rotor 18 is rotationally coupled to a connecting rod 28 by a universal joint, such as a gear joint 34, as will be described in greater detail below. The connecting rod 28 is received in a hollow drive shaft 33 having a relative long hollow quill portion 35 and an integral gear joint shell 37. The connecting rod 28 and hollow drive shaft 33 are, in turn, rotationally coupled to a drive shaft 32 at their opposite ends by a universal joint, such as a gear joint 36, as will be described in greater detail below.

The drive shaft 32 is rotationally coupled to a motor 38. When the motor 38 rotates the drive shaft 32, the connecting rod 28 is also rotated, causing the rotor 18 is rotate about its central axis and thus eccentrically rotate within the stator 14. At least the axially inner end of the connecting rod 28 (the left-most end in FIG. 1) may rotate with a generally eccentric motion along with the rotor 18, while the axially outer end of the connecting rod 28 (right-most end in FIG. 1) may rotate in a more central, less eccentric manner, more closely matching the central non-eccentric rotation of the drive shaft 32.

As the rotor 18 turns within the stator 14, the cavities 24 progress from an inlet or suction end 40 of the rotor/stator pair to an outlet or discharge end 42 of the rotor/stator pair (or in the opposite direction, depending upon the desired operation of the pump 10). During a single 360° revolution of the rotor 18, one set of cavities 24 is opened or created at the inlet end 42 at exactly the same rate that a second set of cavities 24 is closing or terminating at the outlet end 40 which results in a predictable, pulsationless flow of pumped material.

The pitch length of the stator 14 may be twice that of the rotor 18, and the present embodiment illustrates a rotor/stator assembly combination known as 1:2 profile elements, which means the rotor 18 has a single lead and the stator 14 has two leads. However, the pump 10 can also use any of a variety of rotor/stator configurations, including more complex progressing cavity pumps such as 9:10 designs where the rotor 18 has nine leads and the stator 14 has ten leads. In general, nearly any combination of leads may be used so long as the stator 14 has one more lead than the rotor 18. Progressing cavity pumps are discussed in greater detail in U.S. Pat. Nos. 2,512,764, 2,612,845, 5,722,820, 6,120,267 and 6,491,591, the entire contents of which are incorporated herein by reference.

Figure 3:
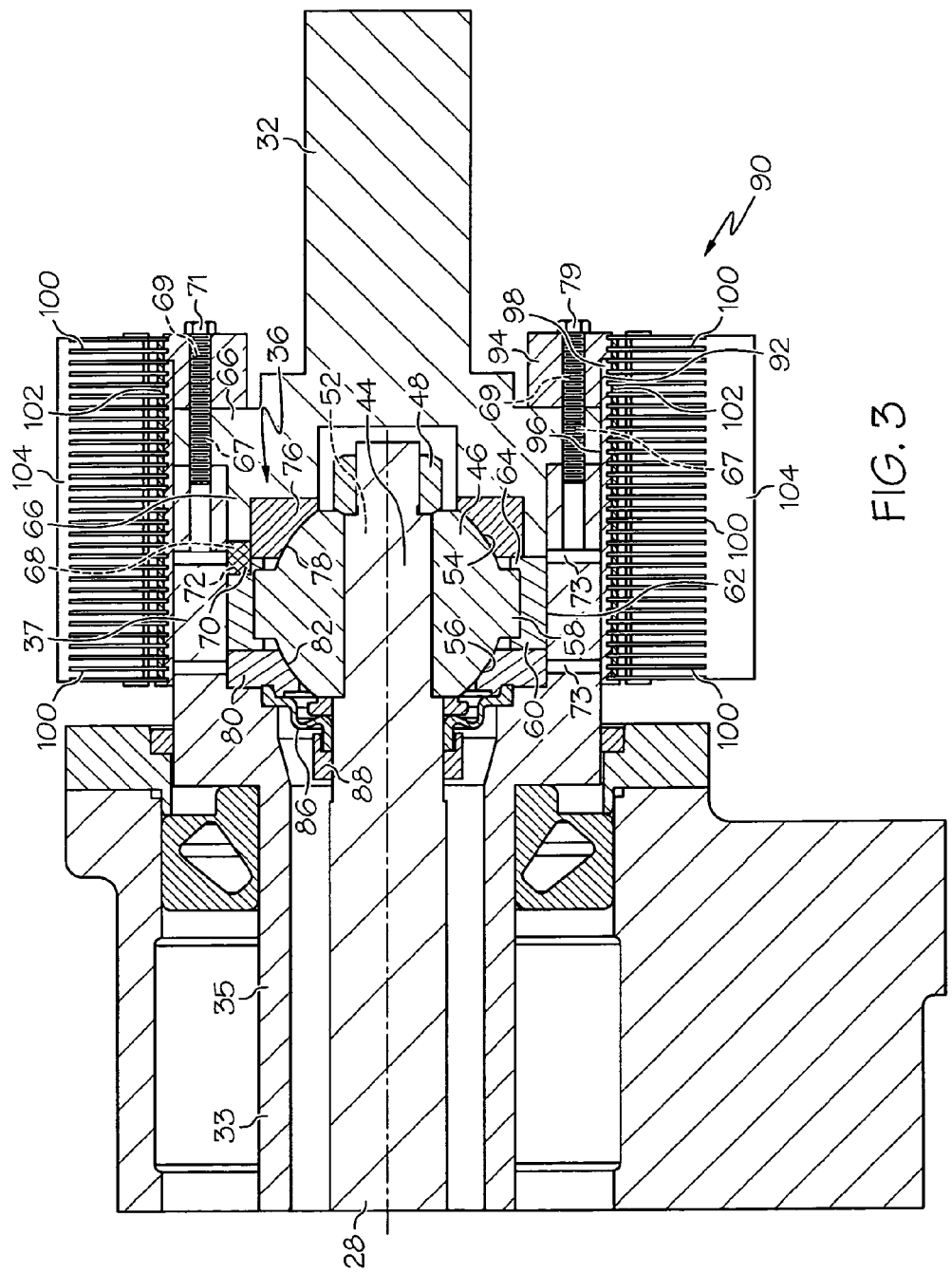
FIG. 3 is a side cross section of a gear joint of the pump of FIG. 1.
Figure 4:
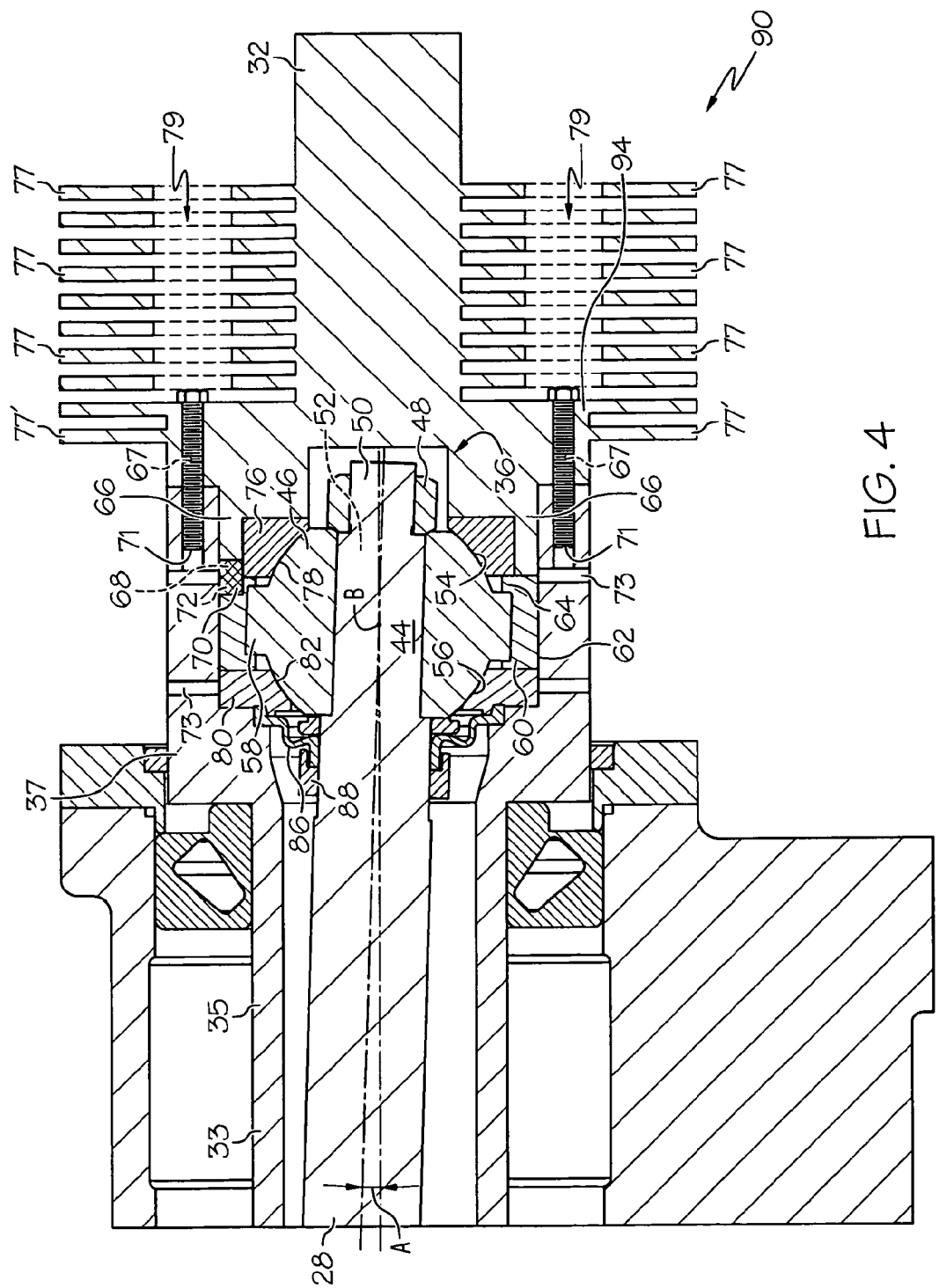
FIG. 4 is a side cross section of the gear joint of FIG. 3, with the shaft moved to a different position, and showing an alternate fin arrangement.
Figure 5:
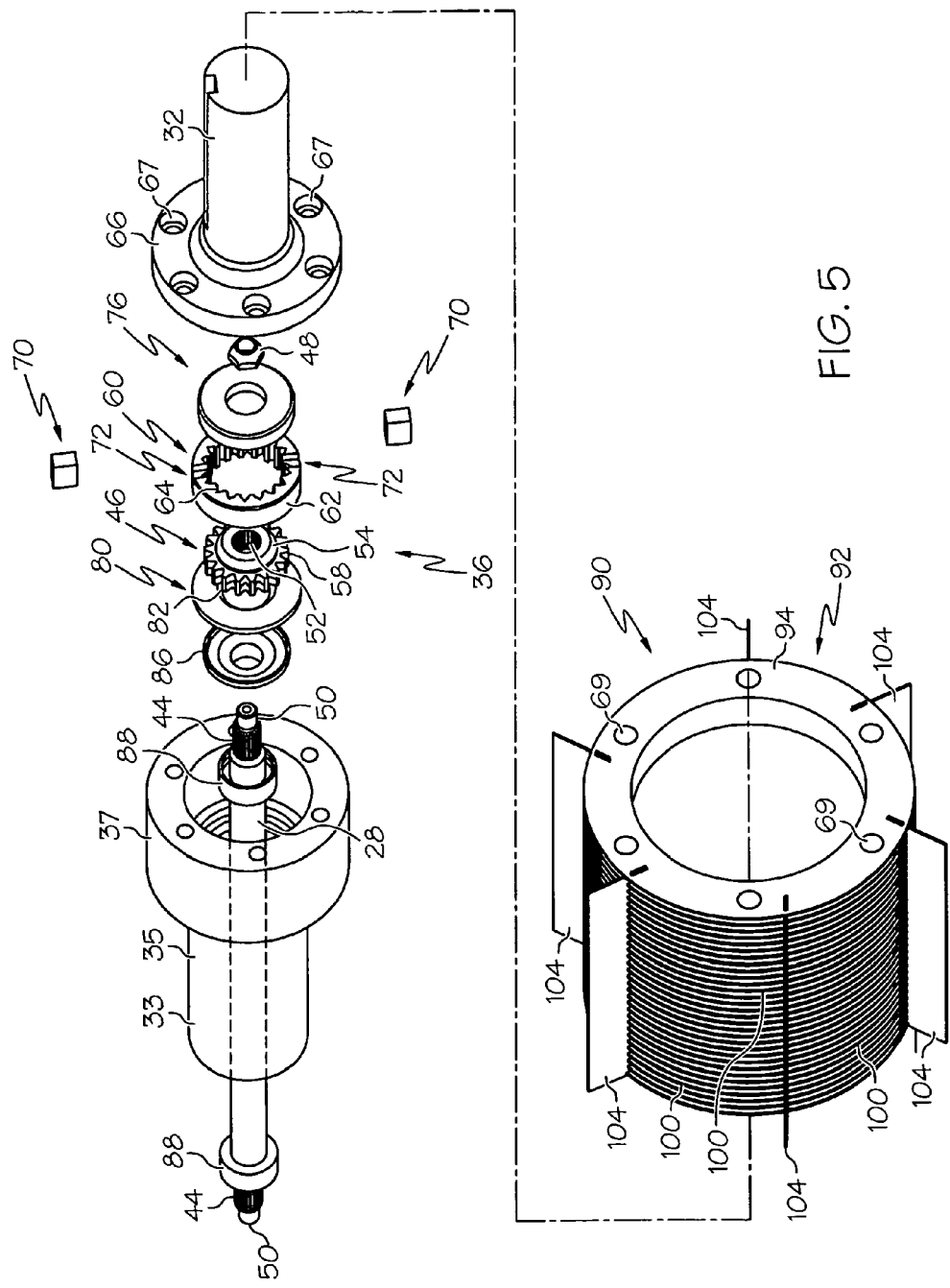
FIG. 5 is a rear exploded perspective view of the rotor, connecting rod, gear joint and cooling system of FIG. 3.

As best shown in FIGS. 3-5, the drive shaft 32 includes a drive shaft head 66 at an axial end thereof. A ring gear 60 is positioned inside the gear joint shell 37 and adjacent to the drive shaft head 66. The drive shaft head 66 includes one or more circumferentially-extending recesses 68 at an end thereof (FIGS. 3 and 4), and the ring gear 60 has one or more corresponding circumferentially-extending recesses 72 aligned with the recesses 68 of the drive shaft head 66 (FIGS. 3-5). A key 70 is received in each aligned recess 68, 72 to rotationally couple the drive shaft 32 and ring gear 60 (see FIGS. 3 and 4, each of which illustrate one key 70, and FIG. 5 which illustrates both keys 70).

In the illustrated embodiment the ring gear 60 includes a relatively smooth circumferential outer surface 62 that is in contact with, or positioned closely adjacent to, the gear joint shell 37. The ring gear 60 further includes a set of radially-inwardly extending teeth 64.

The ring gear 60 receives a ball gear 46 therein, the ball gear 46 carrying a set of radially-outwardly extending teeth 58 extending circumferentially around the ball gear 46. The teeth 58 of the ball gear 46 mesh with the teeth 64 of the ring gear 60 to rotationally couple those components. The ball gear 46 may be generally spherical, or have generally spherical or partially spherical opposed outer surfaces 54, 56 (following industry convention, a surface which has a spherical profile or surface, yet which is not necessarily a complete sphere, is nevertheless described herein as spherical).

The ball gear 46 may have a central opening 52 formed therethrough. The connecting rod 28 includes a smaller diameter shaft portion 44 at or adjacent to an end thereof which protrudes through the opening 52 of the ball gear 46. As shown in FIG. 5, the shaft portion 44 of the connecting rod 28 may be splined, and the opening 52 of the ball gear 46 may have a plurality of axially-extending grooves to rotationally couple those components. However, the ball gear 46 and connecting rod 28 can be rotationally coupled by any of a wide variety of manners, such as pins, frictional fits, keys, interengaging geometries, etc. A nut 48 is threaded onto a distal/protruding end 50 of the rod 28 to secure the connecting rod 28 in place in the gear joint 36.

A primary thrust plate 76 is positioned generally between the ball gear 46 and the drive shaft head 66 to accommodate thrust forces and is at least partially received in the drive shaft head 66. The axially inner surface 78 (i.e., the surface facing the ball gear 46) of the primary thrust plate 76 is spherical and defines a recess with a shape/diameter matching the spherical surface 54 of the ball gear 46 to define a shape matching the ball gear 46. In this manner, any primary thrust forces from the connecting rod 28 (i.e., thrust forces applied in the left-to-right direction of FIGS. 2 and 3) are transmitted to the ball gear 46, and thereby to the primary thrust plate 76, which takes up/distributes the thrust forces to avoid damaging other components in the ball gear joint 36. The ball gear joint 36 may also include a secondary thrust plate 80 positioned on the opposite end of the ball gear 46 to accommodate thrust forces applied in the opposite direction (i.e., right-to-left direction). The secondary thrust plate 80 has a spherical inner surface 82 shaped to engage the spherical surface 56 of the ball gear 46.

A pliable seal 86 is positioned about the connecting rod 28 and adjacent to the ball gear 46/secondary thrust plate 80 to seal and fluidly isolate the ball gear joint 36. A seal retainer 88 is carried on the connecting rod 28 and receives part of the seal 86 therein to retain the seal 86 in place. The gear joint shell 37, which is integral with the drive shaft 33/quill 35 in the illustrated embodiment, is positioned about the sealing collar 84, seal 86, primary 76 and secondary 80 thrust plates, ball gear 46, ring gear 60, shaft portion 44 and part of the drive shaft head 66, and coupled to the drive shaft head 66 (i.e. via fasteners 71) to fluidly protect and seal those components. Radially-extending openings 73 may extend through the gear joint shell 37 and be configured to receive a set screw therein (not shown) to secure the gear joint shell 37 to the gear joint, and/or to allow lubrication access to seal/close the opening.

As shown in FIG. 3, at certain times the connecting rod 28 may be generally axially aligned, or aligned within a certain plane, with the central axis of the gear joint 36 and/or drive shaft 32. At other times during operation of the pump 10, particularly during the eccentric rotation of the connecting rod 28/rotor 18, the connecting rod 28 may be positioned at angle relative to the central axis of the gear joint 36/drive shaft 32. For example, FIG. 4 illustrates the connecting rod 28 forming an angle A relative to the central axis of the gear joint 36/drive shaft 32. However, the ball gear joint 36 allows the connecting rod 28 to pivot to various angular positions while still maintaining a seal and transmitting rotation.

In particular, pivoting of the connecting rod 28 causes the ball gear 46 to pivot about its central axis B relative to the ring gear 60 and thrust plates 76, 80. The spherical engagement surfaces 54, 56 of the ball gear 46 engage and slide along spherical engagement surfaces 78, 82 of the thrust plates 76, 80 to smoothly guide the rotation of the ball gear 46 about its central axis B. The ball gear teeth 58 and the ring gear teeth 64 overlap in the radial and axial directions sufficiently to ensure that the teeth 58, 64 remain intermeshed, even when the ball gear 46 is pivoted. The connecting rod 28 can also pivot into and out of the plane of the sheets of FIGS. 3 and 4, and the spherical surfaces 54, 56, 78, 82 smoothly guide such pivoting. This design of the gear joint 36 enables radial and axial loads to be separately transmitted enabling higher loads to be accommodated during operation.

As noted above, the gear joints can experience high temperatures, particularly when placed under high loads. For example, when the pump 10 is used to continuously inject fluid underground at high pressure, or for long periods of time, the pump 10 and gear joints 34, 36 are placed under high loading. In this case the temperature of the lubricant (grease, oil or the like) in the gear joints 34, 36 can be raised, which can lead to a viscosity breakdown of the lubricant. As the lubricant's viscosity decreases, the gear joints 34, 36 can experience metal-to-metal contact, which can lead to joint failure. It is also possible that a sufficient increase in temperature can cause the lubricant to vaporize and/or off-gas, which could causes the seals to rupture or expand sufficiently to allow the seals to be breached.

FIGS. 1-5 illustrate a pump with a first cooling system 90 for use with gear joint 36. In the embodiment shown in FIGS. 1-3 and 5, the system 90 may include a generally cylindrical sleeve 92 with an annular lip 94 at and outer/upstream end. The sleeve 92 has an inner surface 96 that tightly fits over, and is in close engagement with, the radially outer surface of the gear joint shell 37 and/or drive shaft head 66 (see FIG. 3). A plurality of fasteners 71 are passed though openings 69 of the lip 94, through openings 67 of the drive shaft head 66 and into the gear joint shell 37 to couple the sleeve 92 to the drive shaft 32. When the sleeve 92 is fit in place, the lip 94 engages the axial end surface of the drive shaft head 66 to ensure that the sleeve 92 is properly axially located. In one embodiment, as shown in FIG. 3, the sleeve 92 includes a cylindrical portion 98 and a lip portion 94 that are press-fit or otherwise coupled together. Alternately, in another embodiment the sleeve 92 and lip 94 are formed as a single seamless piece of material.

It may be desired to provide a close fit between the sleeve 92 and gear joint shell 37/drive shaft 32 to thermally couple the sleeve 92 with the gear joint shell 37/drive shaft 32. In the illustrated embodiment the radially outer surface of the drive shaft head 66 is flush with the radially outer surface of the gear joint shell 37, such that the inner surface 96 of the sleeve 92 is a smoothly cylindrical surface. However, if desired the radially outer surface of the drive shaft head 66 may not be flush with the radially outer surface of the gear joint shell 37, in which case the inner surface 96 of the sleeve 92 may be stepped to form a corresponding close fit. In addition, if desired, a thermally conductive gel, paste or other material can be positioned between the sleeve 92 and gear joint shell 37/drive shaft head 66 to further thermally couple the sleeve 92 with the gear joint shell 37/drive shaft head 66. The thermally conductive material can be a refractory material including a thermally conductive filler, such as a polymer, with conductive materials carried/suspended therein. The gel/paste or other thermally conductive material also helps to fill any air voids to improve thermal coupling between the sleeve 92 and gear joint shell 37/drive shaft head 66.

The sleeve 92 includes a plurality of annular, radially outwardly-extending, axially spaced fins 100 coupled thereto. In the illustrated embodiment each fin 100 has a narrow (axial) thickness as compared to its (radial) length to improve the cooling effects provided by the fins 100. For example, in one case each fin 100 has a thickness that is less than about ⅕, or in another case less than about 1/10, of its length. The fins 100 may have a space therebetween about equal to between about one and two times the thickness of each fin 100. The number of fins 100 can vary, such as at least three, or at least ten, or less than fifty to provide sufficient cooling without adding too much complexity or expense.

As best shown in FIG. 3, a spacer 102 may be positioned between each fin 100, at a base thereof, to lend support to the fins 100 and maintain appropriate spacing. Alternately, or in addition, the sleeve 92 may include a plurality of grooves, each of which receives the inner end of a fin 100 therein. In any case, by coupling the fins 100 to the sleeve 92, the fins 100 are thermally coupled to gear joint shell 37/drive shaft head 66, thereby effectively increasing the surface area of the gear joint shell 37/drive shaft head 66. The sleeve 92/fins 100 act as a radiator, improving the cooling efficiency of the pump 10. In addition, since the fins 100 are also rotated as the drive shaft 32 rotates (in the range of about 350 rpm, in one case, or between about 5 and about 1000 rpm in one case, or between about 100 and about 500 rpm in another case), the fins 100 provide more efficient, active cooling.

The sleeve 92 may also include a plurality of radially-outwardly extending, axially aligned paddles 104 positioned generally perpendicular to the fins 100. In the illustrated embodiment the sleeve 92 includes six paddles 104 equally spaced about the circumference of the sleeve 92, and each paddle 104 extends radially outwardly beyond the fins 100. During operation, the paddles 104 break up laminar/boundary air flow patterns between the fins 100 and create turbulence in the air flowing across the fins 100, thereby improving cooling by convection. The paddles 104 may also, themselves, conduct heat away from the pump 10/gear joint 36 and therefore further aid in cooling.

Figure 2:
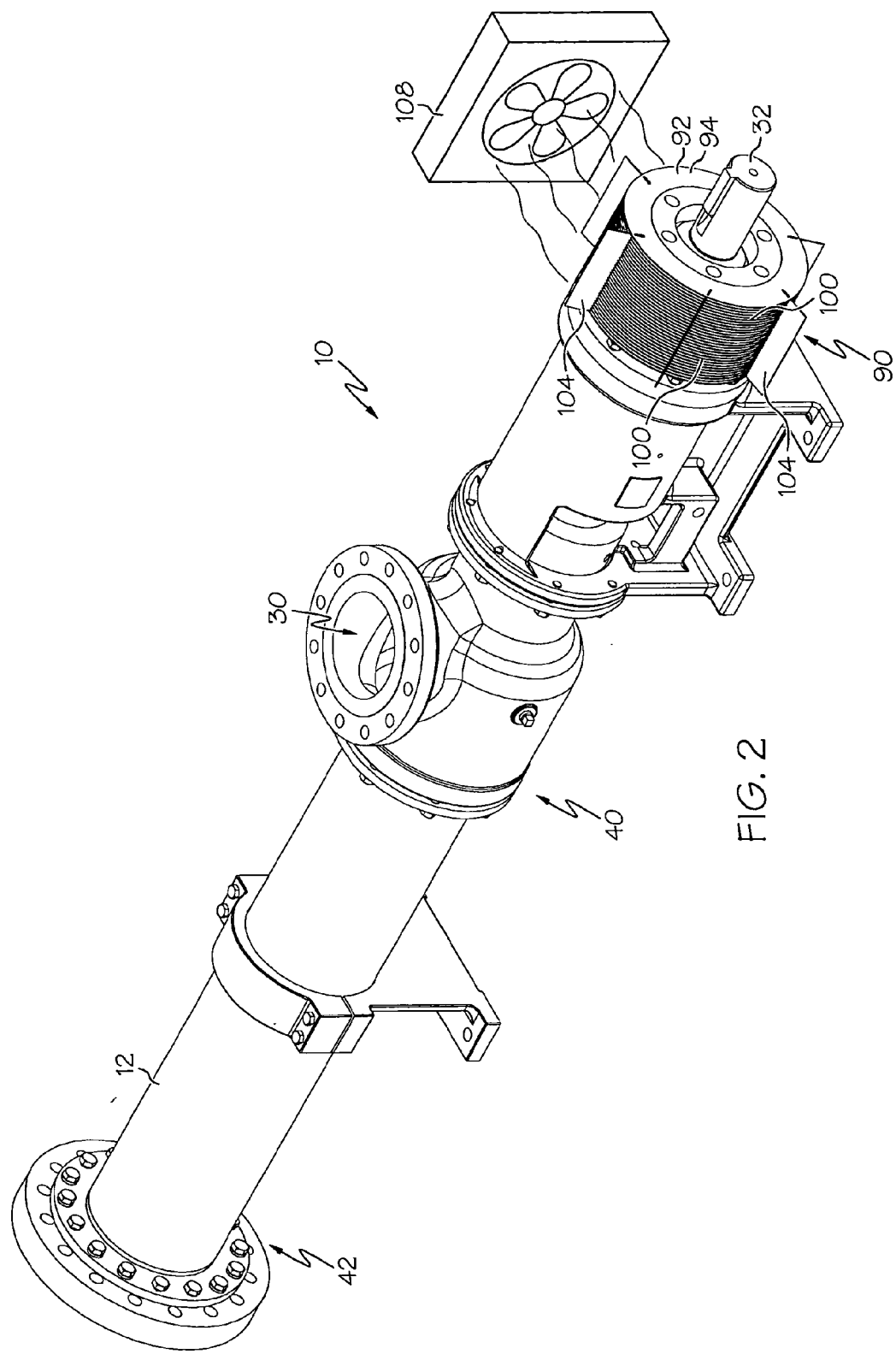
FIG. 2 is a top perspective view of the pump of FIG. 1, shown in conjunction with a fan.

If desired, the cooling effect of the sleeve 92 can be improved by passing a fluid across the sleeve 92/fins 100/paddles 104. For example, in one embodiment, as shown in FIG. 2, air is forced across the sleeve 92, fins 100 and paddles 104, such as by use of a fan, blower, or other air movement device 108. In an alternate embodiment, a liquid such as water is misted and/or sprayed onto the sleeve 92, fins 100 and/or paddles 104 to increase cooling, such as by evaporation.

The drive shaft head 66, sleeve 92, shell 37, fins 100 and paddles 104, or at least parts thereof, can be made of a thermally conductive material, such as metal, including aluminum. As noted above, since significant loading may be carried at the interface between the ball gear 46 and the primary thrust plate 76 (FIG. 3), the thrust plate 76 can get hot, and in fact is the component which is projected to reach the highest temperature in the gear joint 36. Since the drive shaft head 66 is in direct contact with the thrust plate 76, by making the drive shaft head 66 of a thermally conductive material, the heat of the thrust plate 76 can be carried away by the drive head shaft 66 to the gear joint shell 37 and sleeve 92, fins 100 and paddles 104 by conductivity. Similar heat conductivity can be provided to the secondary thrust plate 80 by the shell 37. The sleeve 92, fins 100 and paddles 104 then dissipate heat, primarily by convection, to provide cooling to the pump 10/gear joint 36, and improve the performance thereof.

In addition, the drive shaft head 66, in the illustrated embodiment, is positioned adjacent to and in contact with the radially outer and axially outer surface of the thrust plate 76, and the drive shaft head 66 is positioned adjacent to and in contact with the sleeve 92. Thus, in one case the drive shaft head 66 may contact or be positioned immediately adjacent to at least about 25%, or at least about 50%, of the surface area of the thrust plate 76 to ensure proper thermal coupling therewith.

The position of the fins 100 can be varied. For example, as shown in FIG. 4, in an alternate embodiment a plurality of fins 77 are carried on the drive shaft 32. In the illustrated embodiment the fins 77 are unitary with, and formed as a single piece with, the drive shaft 32, although the fins 77 could also be formed on a separate sleeve fit over or otherwise coupled to the drive shaft 32. The illustrated embodiment also shows some shorter fins 77' positioned on the drive shaft head 66. The fins 77 carried on the main body of the drive shaft 32 may include a plurality of openings 79 (FIG. 4) formed therethrough, each opening 79 being aligned with an opening 67 (see FIG. 5) of the drive shaft 32. The openings 79 provide access to the fasteners 71 and allow the fasteners 71 to be inserted or extracted therethrough.

The fins 77 may be analogous in construction and operation to fins 100, and may have the same or similar characteristics to those described above for the fins 100. For example, the fins 77 may be used in association with paddles and/or an air movement device, may be made of aluminum or other metals, have the same relative dimensions described above, etc. The fins 77 are thermally coupled to the drive shaft 32, and therefore to the thrust plate 76/gear joint 36. Thus the fins 77 help to dissipate heat in the same or similar manner to the sleeve 92 and fins 100. In this particular illustrated embodiment, the fins 77 may not axially overlap with the thrust plate 76/gear joint 34. The fins 77 may be used in combination with the sleeve 92/fins 100, or can be used alone (i.e. without the sleeve 92/fins 100). Moreover, besides being located on the drive shaft 32/sleeve 92, the fins 100/77 may be integrally formed with or located on the outer shell 37.

FIGS. 6-9 illustrate another cooling system 110 for reducing/maintaining the temperature of the universal joint/gear joint 34. In this embodiment a generally cylindrical cooling jacket 112 or sleeve is positioned over the outer shell 37 of the gear joint 36 in a coaxial manner. The cooling jacket 112 has a radially outwardly-extending flange 114 at an axially inner end thereof positioned adjacent to a frame/body of the pump 10. A plurality of fasteners 116 are passed though the flange 114 and into the frame to couple the cooling jacket 112 to the pump 10. However, the cooling jacket 112 can be coupled to the pump 10 by any of a variety of other manners.

A pair of annular seals 118 are positioned between the cooling jacket 112 and the shell 37 such that the seals 118, cooling jacket 112 and shell 37 together define a generally annular cooling chamber 120 (FIGS. 7 and 8) that can extend entirely circumferentially about the shell 37. The cooling chamber 120 may be fluidly isolated from the gear joint 36 due to the sealed nature of the shell 37. The cooling jacket 112 includes a pair of radially-extending lips 122, each lip 122 being positioned adjacent to a seal 118 to help retain the associated seal 118 in place and prevent axial movement thereof. In the illustrated embodiment, each seal 118 is positioned adjacent to a single lip 122, although if desired each seal 118 can be positioned between a lip 122 on either side thereof to securely retain the seals 118 in place. Further alternately, it is not necessarily required that the cooling jacket 112 include any such lips 122.

Each seal 118 may be made of a fluid-tight material, and can be lip seals to provide secure sealing engagement with the cooling jacket 112 and shell 37. Moreover, each seal 118 can be radially compressed between the cooling jacket 112 and the outer shell 37 to help keep the seals 118 in place and provide improved sealing characteristics. During operation of the pump 10 the outer shell 37 may rotate relative to the cooling jacket 112/seals 118. Thus the seals 118 should be made of a sufficiently strong and/or high lubricity material to withstand/minimize shear forces during operation of the pump 10.

Figure 6:
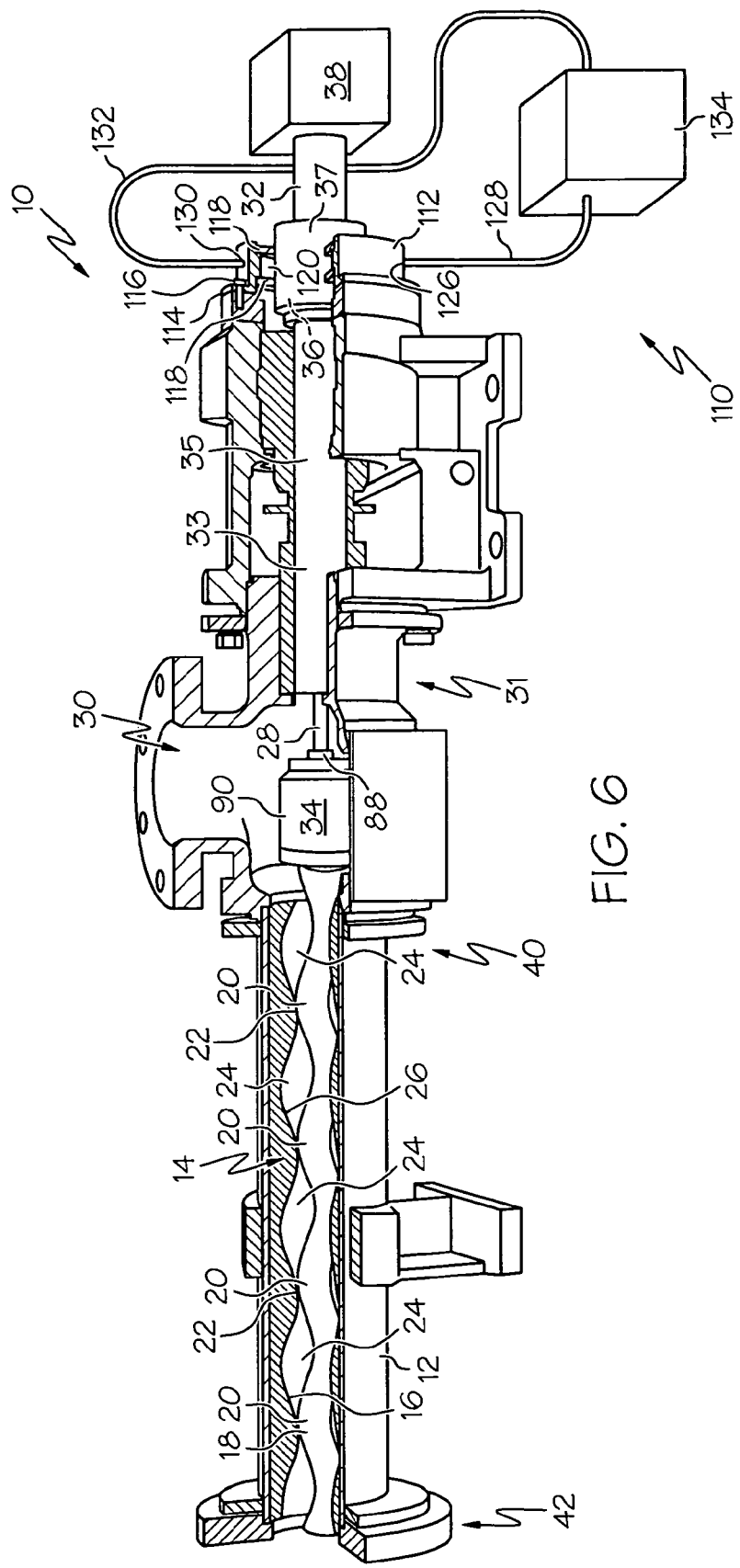
FIG. 6 is a side perspective partial cut-away view of a progressing cavity pump with an alternate cooling system.
Figure 8:
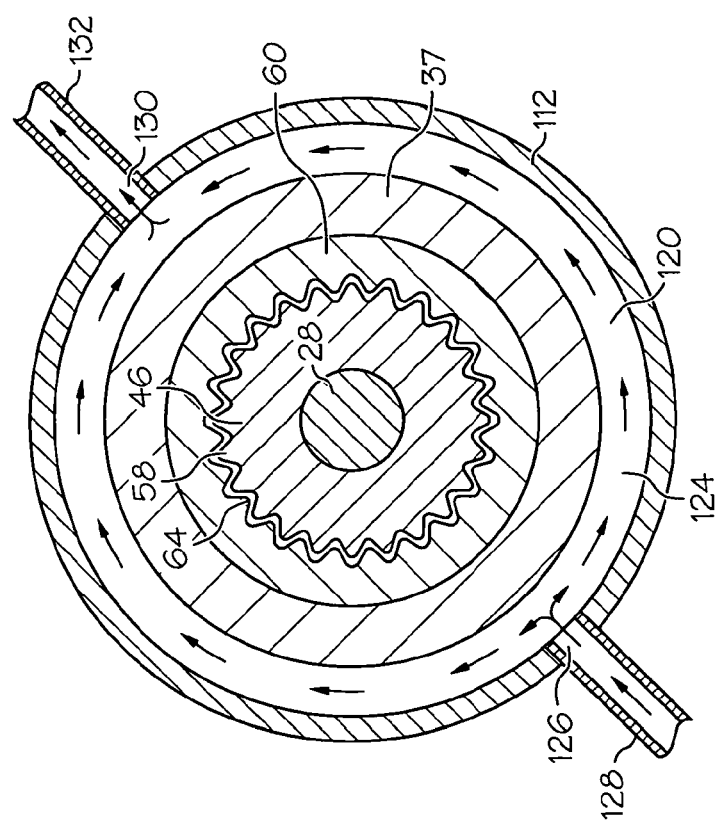
FIG. 8 is a cross section taken along line 8-8 of FIG. 7.
Figure 9:
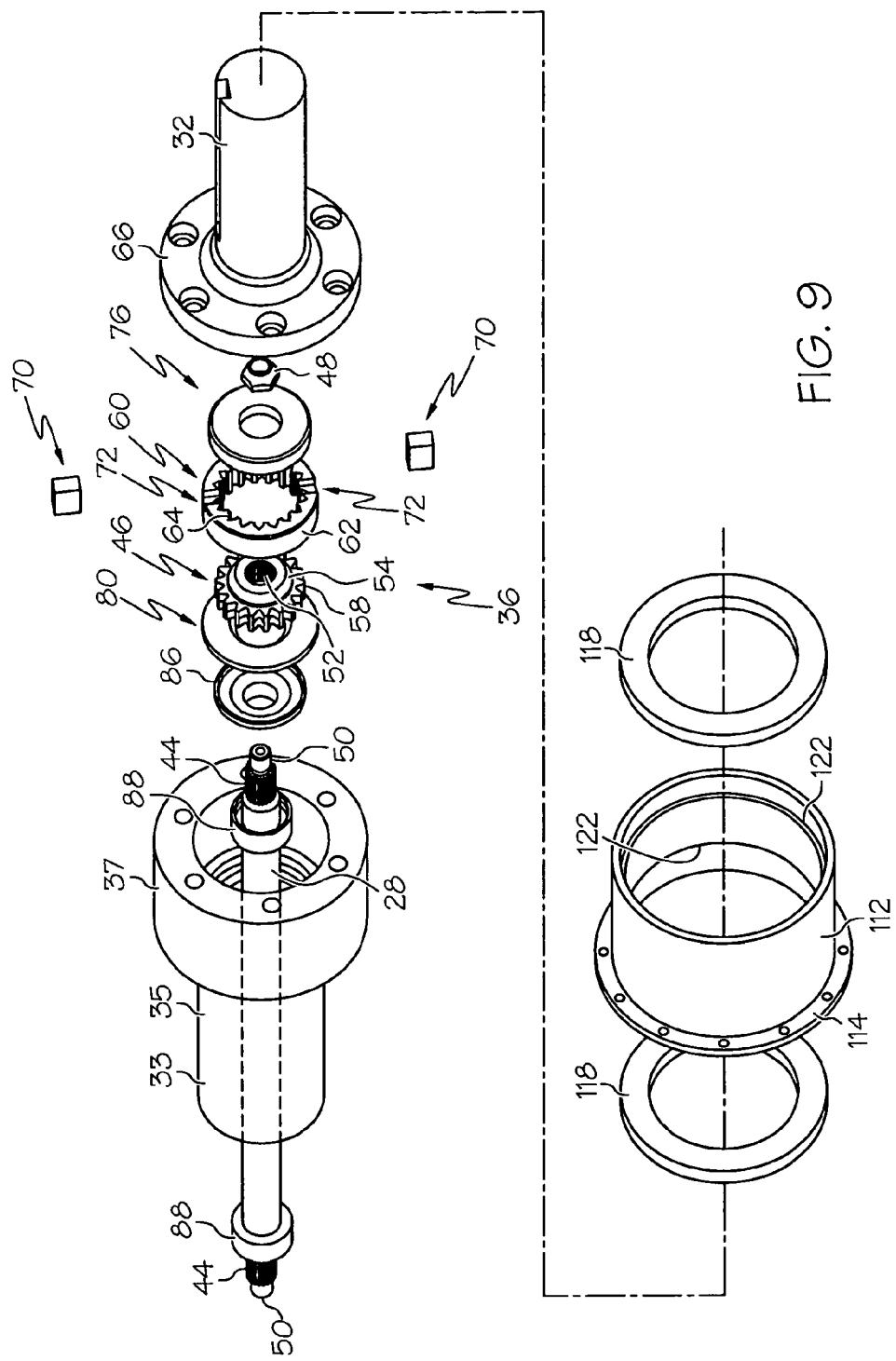
FIG. 9 is a rear exploded perspective view of the rotor, connecting rod, gear joint and cooling system of FIG. 7.

A cooling fluid 124 is introduced into, and circulated about, the cooling chamber 120 to provide cooling effects to the gear joint 36. In particular, as best shown in FIGS. 6 and 8, the cooling jacket 112 includes an inlet port 126, to which an inlet hose 128 is fluidly coupled, and an outlet port 130, to which an outlet hose 132 is fluidly coupled. The hoses 128, 132 are, in turn, fluidly coupled to a cooling and/or pumping device 134 which cools and pumps the fluid 124 circulating through the hoses 128, 132 and cooling chamber 120. In this manner the cooling fluid 124 directly cools the outer surface of the outer shell 37.

Due to the close fit and tolerances between the outer shell 37 and the ring gear 60, cooling of the outer shell 37 also causes cooling of the ring gear 60. This, in turn, also causes the ball gear 46, thrust plates 76, 80, and potentially even connecting rod 28 and drive shaft 32 to be cooled due to the contact between those components and their high thermal conductivity. In particular, the outer shell 37, ring gear 60, ball gear 46, thrust plates 76, 80, connecting rod 28 and drive shaft 32 may all be made of metal which enables cooling applied to the outer shell 37 to cool the entire gear joint 36, particularly the thrust plate 76, 80/ball gear 46 surfaces which can experience the most temperature increase under demanding pumping conditions.

Figure 7:
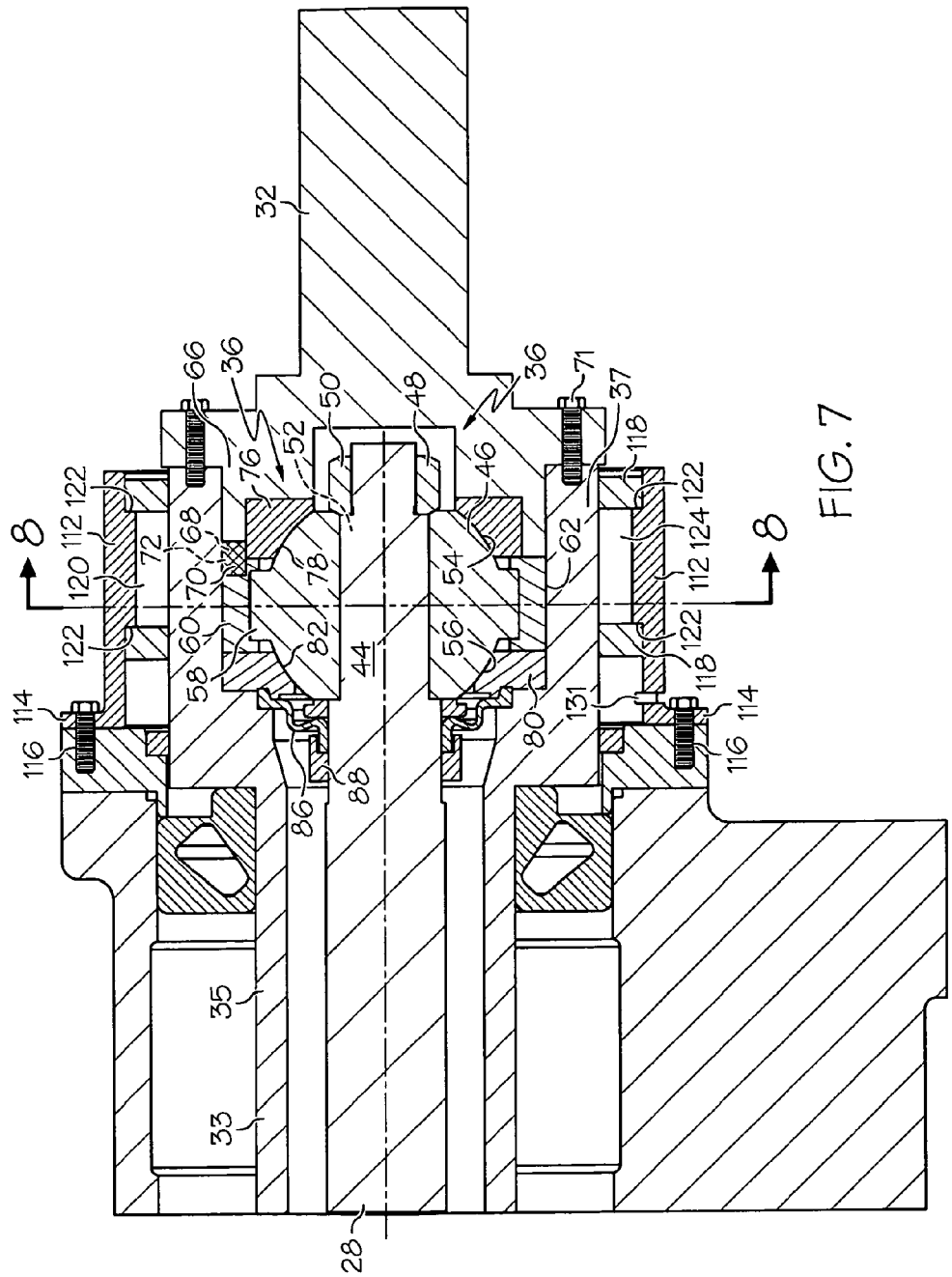
FIG. 7 is a side cross section of a gear joint of the pump of FIG. 6.

As shown in FIG. 7, the cooling chamber 120 may be positioned that that it at least partially overlaps the ring gear 60 in the axial direction (e.g. the cooling chamber 120 can be axially aligned with at least part of the universal joint 36), and more particular overlaps at least about 25%, or at least about 50%, or at least about 80% of the axial length of the ring gear 60. Alternately, or in addition, the cooling chamber 120 may be positioned that that it at least partially overlaps the primary thrust plate 76 in the axial direction, and more particular overlaps at least about 25%, or at least about 50%, or at least about 80% of the axial length of the primary thrust plate 76. Such positioning of the cooling chamber 120 ensures that cooling effects are provided to the ring gear 60, which can quickly and efficiently distribute cooling effects to the other components, and/or to the primary thrust plate 76, which may experience the most heat and be most prone to failure when significant loads are applied to the pump 10. It should also be noted that the fins 77/100 and/or sleeve 92 of the cooling system 90 may also overlap the ring gear 60/primary thrust plate 76 in the same percentages as described here in the context of the cooling chamber 120.

The fluid 124 passed through the hoses 128, 132, cooling chamber 120 and cooling and pumping device 134 can take any of a variety of forms, such as liquids (which can be highly thermally conductive) including water, antifreeze solutions such as ethylene glycol solutions, hydraulic fluid, oil, or gases, and the like. The cooling and pumping device 134 may include any of a wide variety of fluid pumps to provide circulation of the fluid. The fluid 124 can be pumped at a relatively low pressure, such as between about 1-10 psi in one case. The cooling and pumping device 134 may cool the circulated fluid 124 by any of a variety of methods, such as by the use of a passive radiator through which the hot fluid 124 is passed, a radiator in combination with an air movement device, or simply a sufficient length of pipe/tubing, etc. Moreover, if desired the cooling and pumping device 134 can include a compressor and the circulating fluid 124 can be a refrigerant, or a fluid in a heat exchange relationship with a refrigerant, such that the cooling and pumping device 134 cools by refrigeration.

In the embodiments outlined above the cooling fluid 124 is contained with a closed circuit and isolated from the fluid that is pumped by the progressing cavity pump 10. However, if desired, the fluid that is pumped by the pump 10 can be circulated through the cooling chamber 120 and act as the coolant. In this case, then, a cooling and pumping device 134 may not be required since the pressure generated by the pump 10 can be used to circulate fluid through the cooling chamber 120. The input hose 128/input port 126 may be fluidly coupled to an upstream position of the pump 10, and the output hose 132/output port 130 may be fluidly coupled to a position downstream of the upstream position. In either case, then, cooling fluid 124 is conveyed toward, and then away from the universal joint/gear joint 36. Moreover, cooling fluid 124 from another source, such as a municipal water supply, well, or other water source, may be continuously fed into input port 126 and drained out of the output port 130 in an open circuit configuration.

As shown in FIGS. 6 and 8, in the illustrated embodiment the inlet port 126 is positioned at or near the bottom of the cooling jacket 112, or in the bottom half thereof, and the outlet port 130 is positioned above the inlet port 126, at or near the top of the cooling jacket 112, or in the upper half thereof. This design helps to ensure that fluid 124 (particularly liquid and heavy gases) pools or builds up in the cooling chamber 120, generally surrounding and cooling the gear joint 36, before the exiting the cooling chamber 120. The cooling jacket 122 may include a drain port 131 at the bottom thereof (FIG. 7), and positioned axially inwardly of the associated seal 118. In this manner, if the adjacent seal 118 should leak, the leaked cooling fluid 124 is allowed to drain via port 131, and the operator can be notified that of the existence of the leak by examining the drain port 131 and surrounding area for leakage.

Testing has found that, under particular tested high load conditions, the operating temperature of a gear joint 36 may rise to about 226° F. after about 88 minutes of operation, without any active cooling. Once the cooling system was activated, the temperature at the gear joint 36 dropped to about 149° F. after eight minutes of cooling, and further dropped to a temperature of about 124° F. after eighteen minutes of cooling. Thus the cooling system provides immediate or near-immediate and significant cooling benefits, providing the advantages described above.

It is noted that FIGS. 1-9 and the and accompanying description provided above show the cooling systems 90, 110 applied to the universal joint/gear joint 36. However, it is possible the cooling systems 90, 110 can also be applied to the universal joint/gear joint 34 (FIGS. 1 and 6) by mounting the sleeve(s) 92 or fins 77/100 thereon, or mounting the cooling jacket 112 thereon. It should also be understood that the cooling system 90 of FIGS. 1-4 and/or FIG. 5 may be used in combination with the cooling system 110 shown in FIGS. 6-9; that is, cooling by both devices/methods may be utilized simultaneously. Both the embodiment of FIGS. 1-5 and FIGS. 6-9 cool the joint by active heat exchange; i.e. the rotation of the drive shaft head 66 and fins 100/77, circulation of fluid 124, etc., rather than simply allowing heat to propagate naturally through the gear joint 34, 36, to improve cooling and pump operation.

The cooling systems 90, 110 described herein significantly reduces the temperature of the gear joint during operation of the pump 10 (or otherwise), which provides several advantages. In particular, cooling the gear joint allows the pump 10 to be utilized in higher loaded applications, such as injecting fluid underground at high pressure continuously or for long periods of time. Without such a cooling system, such higher loaded applications may be impractical, and thus the cooling system expands the range of operations of the pump. The cooling system(s) also reduces the temperature of the lubricant (such as grease) in the gear joint(s). If the lubricant is excessively heated, the thin film maintained between loaded parts can be breached, leading to damage or failure of the loaded parts.

The drawing and description disclosed herein also show the cooling system(s) 90, 110 applied to the universal joint/gear joint 34, 36 of a progressing cavity pump 10. However, the cooling system(s) can be used in conjunction with any universal joint/gear joint, and not necessarily joints used in a progressing cavity pump. The cooling system(s) can also be used in conjunction with any gear system that couples shafts or components, one of which rotates eccentrically relative to the other. In addition, the system can be utilized in conjunction with various other types of universal joints, besides gear joints, useful for transmitting rotation between non-aligned components (i.e. two rotating shafts that are not axially aligned, or are not aligned for all rotation), such as pin-style universal joints, Cardan joints, constant velocity joints, elastic coupling, rag joints, Canfield joints, etc.

Having described the invention in detail and by reference to certain embodiments, it will be apparent that modifications and variations thereof are possible without departing from the scope of the invention.

What is claimed is:

1. A progressing cavity pump system comprising:
    a pump comprising:
        a rotor;
        a stator having an inner cavity, said rotor being rotationally disposed inside said inner cavity of said stator such that rotation of said rotor relative to said stator causes material in said inner cavity to be pumped therethrough; and
    a universal joint directly or indirectly rotationally coupled to said rotor and fluidly isolated from said inner cavity; and
    a cooling system thermally coupled to said universal joint and configured to cool said universal joint by active heat exchange at a position remote from said universal joint by passing a fluid about said universal joint or about said pump at a position external of said inner cavity, wherein said external position is axially aligned with at least part of said universal joint to provide cooling thereto.

2. The system of claim 1 wherein said universal joint is a gear joint including a ball gear and a ring gear receiving said ball gear therein and rotationally coupled thereto, and wherein said remote position is remote from said ball gear and said ring gear.

3. The system of claim 1 wherein said universal joint is a gear joint including a ball gear and a ring gear receiving said ball gear therein and rotationally coupled thereto, wherein said ball gear has a spherical surface, and wherein the gear joint further includes a thrust plate positioned adjacent to said ball gear and having a spherical recess in contact with said spherical surface of said ball gear.

4. The system of claim 1 wherein said rotor is rotationally coupled to a connecting rod, which is in turn rotationally coupled to a drive shaft, and wherein said universal joint rotationally couples to said rotor to said connecting rod, or rotationally couples said connecting rod to said drive shaft.

5. The system of claim 1 wherein said cooling system includes an assembly configured to convey said fluid toward and then away from said universal joint.

6. The system of claim 5 wherein said assembly includes a pump and is configured to convey said fluid toward and then away from said remote position.

7. The system of claim 5 wherein the assembly is configured to convey said fluid to said remote location that is remote relative to said external position, and wherein the assembly further comprising includes a radiator at said remote position location and thermally coupled to said fluid to reduce the temperature of said fluid at said remote location.

8. The system of claim 1 wherein said universal joint is a gear joint including a ball gear and a ring gear receiving said ball gear therein and rotationally coupled thereto, and wherein said gear joint further includes an outer shell receiving said ring gear and said ball gear therein, and wherein the cooling system is configured to pass said fluid about and in contact with an outer surface of said outer shell to thereby cool said gear joint.

9. The system of claim 8 wherein said outer shell fluidly isolates said fluid from said ring gear and said ball gear.

10. The system of claim 8 wherein said cooling system further includes a cooling jacket extending circumferentially about said outer shell to at least partially define a cooling chamber positioned between said cooling jacket and said outer shell, wherein said cooling chamber is configured to receive said fluid therein.

11. The system of claim 10 wherein the cooling system further includes a pair of generally annular seals positioned between said cooling jacket and said outer shell to at least partially define said cooling chamber therebetween.

12. The system of claim 10 wherein the cooling system further includes a fluid inlet fluidly coupled to said cooling chamber and positioned at a lower portion thereof.

13. The system of claim 10 wherein the cooling system is configured to convey said fluid to said remote location relative to said external position, where the fluid is cooled, and wherein said cooling chamber is in closed-loop fluid communication with said remote position location.

14. The system of claim 10 wherein said cooling chamber is configured to receive said fluid that is fluidly isolated from any material being pumped through said stator.

15. The system of claim 10 wherein said cooling chamber is configured to receive therein fluid material that is pumped through said stator.

16. The system of claim 10 wherein said ball gear has a spherical surface, wherein the gear joint further includes a thrust plate positioned adjacent to said ball gear and having a spherical recess in contact with said spherical surface of said ball gear, and wherein said cooling chamber at least partially axially overlaps with said thrust plate.

17. The system of claim 1 wherein said cooling system is configured to pass said fluid about said pump at said external position axially aligned with at least part of said universal joint.

18. The system of claim 1 wherein said fluid at said external position is generally thermally isolated from said material in said inner cavity.

19. The system of claim 1 wherein the pump system is configured such that no portions of said inner cavity are positioned radially between said fluid and said universal joint.

20. The system of claim 1 wherein said cooling system is configured to pass said fluid directly about said universal joint or said pump at said external position such that said fluid is in contact with said universal joint or said pump at said external position.

21. The system of claim 1 wherein said pump is configured to convey material therethrough when operated and wherein said universal joint is configured to be fluidly isolated from said material conveyed through said pump.

22. The system of claim 1 wherein the pump is configured to pass said fluid at a position spaced away from said inner cavity.

23. A method for operating a progressing cavity pump system comprising:
    accessing a progressing cavity pump including a rotor and a stator having an inner cavity, wherein said rotor is positioned inside said inner cavity, said pump further including a universal joint directly or indirectly rotationally coupled to said rotor and fluidly isolated from said inner cavity;
    causing said rotor to rotate relative to said stator to cause materials in said inner cavity to be pumped therethrough; and
    cooling said universal joint, during said causing step, by active heat exchange at a position remote from said universal joint by passing a fluid about said universal joint or about said pump at a position external of said inner cavity that is axially aligned with at least part of said universal joint.

24. A joint system comprising:
    a first shaft configured such that at least part of said first shaft rotates generally eccentrically;
    a second shaft rotationally coupled to said first shaft;
    a universal joint rotationally coupling said first and second shafts, said universal joint including a ball gear and a ring gear receiving said ball gear therein and rotationally coupled thereto; and
    a cooling system thermally coupled to said universal joint at a position that is axially aligned with at least part of said universal joint and configured to cool said universal joint by active heat exchange at a position remote from said universal joint.

25. The system of claim 24 wherein said first shaft is a rotor of a progressing cavity pump, said rotor being rotationally disposed inside an inner cavity of a stator such that rotation of said rotor relative to said stator causes material in said inner cavity to be pumped therethrough, and wherein said second shaft is configured to drive said rotation of said rotor, and wherein the system further includes a third shaft positioned between said first and second shafts, wherein said universal joint directly couples said third shaft and one of said first or second shafts, and wherein the system further includes a supplemental universal joint directly coupling said third shaft and the other one of said first or second shafts.

26. The system of claim 24 wherein said cooling system is configured to pass a fluid about said universal joint.

27. The system of claim 24 wherein said cooling system includes a plurality of fins thermally coupled to said universal joint and configured to cool said universal joint.

28. A progressing cavity pump system comprising:
    a rotor;
    a stator having an inner cavity, said rotor being rotationally disposed inside said inner cavity of said stator such that rotation of said rotor relative to said stator causes material in said inner cavity to be pumped therethrough;
    a universal joint directly or indirectly rotationally coupled to said rotor, wherein said universal joint is fluidly isolated from said inner cavity; and
    a cooling system configured to circulate fluid in a manner such that said fluid provides cooling to said universal joint.

29. The system of claim 28 wherein the cooling system is configured to circulate fluid about said pump or said universal joint at an axial location generally aligned with said universal joint.

* * * * *